Nov. 12, 1968  J. OVTCHARENKO  3,409,940

PRESS FOR THE EXTRUSION OF PLASTIC MATERIAL

Filed July 1, 1966

INVENTOR

JEAN OVTCHARENKO

By Young + Thompson

ATTYS.

United States Patent Office 3,409,940
Patented Nov. 12, 1968

3,409,940
PRESS FOR THE EXTRUSION OF
PLASTIC MATERIAL
Jean Ovtcharenko, Eaubonne, France, assignor to Societe
des Etablissements Andouart, a corporation of France
Filed July 1, 1966, Ser. No. 562,277
Claims priority, application France, July 2, 1965,
23,250
3 Claims. (Cl. 18—12)

ABSTRACT OF THE DISCLOSURE

A press with an extrusion screw for feeding a pre-jellified plastic material to a kneading screw provided with a shallow thread and requiring a circumferential speed considerably higher than that of the extrusion screw to provide a strong kneading action on the material over a length extending from one to three times the kneading screw diameter.

---

The present invention relates to the extrusion of plastic materials and in particular to means for improving the yield of a one-screw extrusion press of known kind, as well as the quality of the resultant extruded material.

According to the invention a press for the extrusion of plastic material of the kind comprising a normal extrusion screw ensuring the feed and pre-jelling of the material in the normal manner, comprises a cylinder connected at one end to a feed hopper, an extrusion screw rotatably mounted axially in the cylinder, driving means connected to the extrusion screw for rotating the screw, at least one sheath joined to the other end of the cylinder, a rotatable kneading screw axially mounted in said sheath, means for rotating the kneading screw, the kneading screw comprising at least one shallow thread, and the ratio of the length of the kneading screw to its diameter being between 1 and 3, the driving means being operable in such a manner that the circumferential speed of the kneading screw is 2 to 5 times that of the extrusion screw, so that the output from the said kneading screw equals that from the extrusion screw.

This arrangement ensures that the material which is pre-jelled by the worm screw is well kneaded by the kneading screw, which works on a thin layer of plastic material with a considerable shearing rate; moreover, this kneading screw ensures a pumping action which regulates the output from the feed screw and enables the loss in charge caused by the extrusion head and its equipment to be overcome without using a large amount of energy.

Further according to the invention the axes of the extrusion screw and the kneading screw may intersect, for example at a right angle. Provision may be made to regulate independently one or the other of the speeds of rotation of the two screws, enabling the extrusion press to be used on any given plastic material.

In another embodiment the extrusion press comprises an extrusion screw and two kneading screws the axes of which are parallel to that of the extrusion screw, the outlet from the cylinder containing the extrusion screw being connected by two separate channels to the two cylinders housing the kneading screws which terminate in two separate heads.

Provision may also be made for driving each of the kneading screws at a well defined speed, to ensure a constant desired output from the corresponding head. It is possible moreover to have more than two kneading screws, provided that the total output from these kneading screws corresponds to that from the single extrusion screw.

Figure 1:
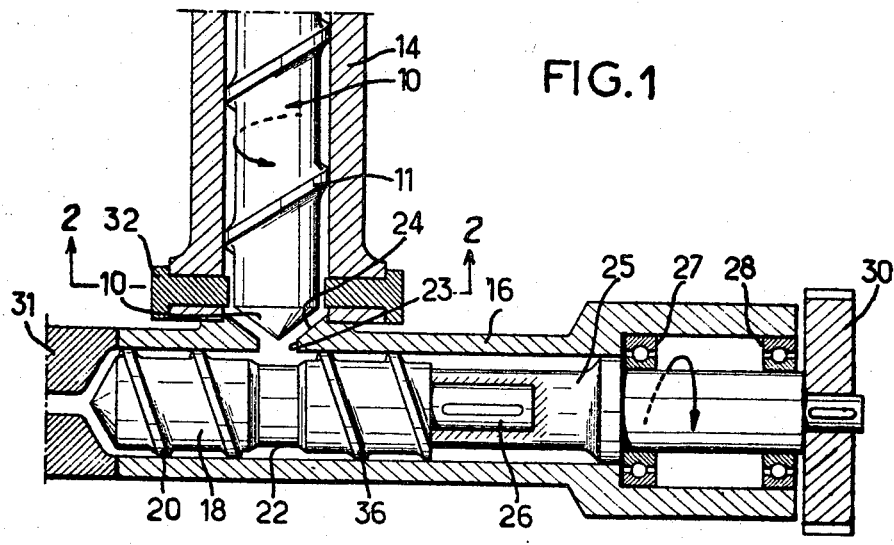
Figure 2:
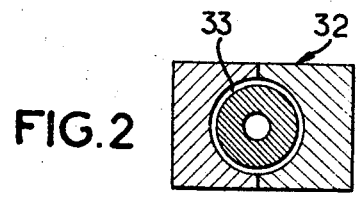
Figure 3:
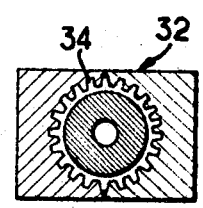
Figure 4:
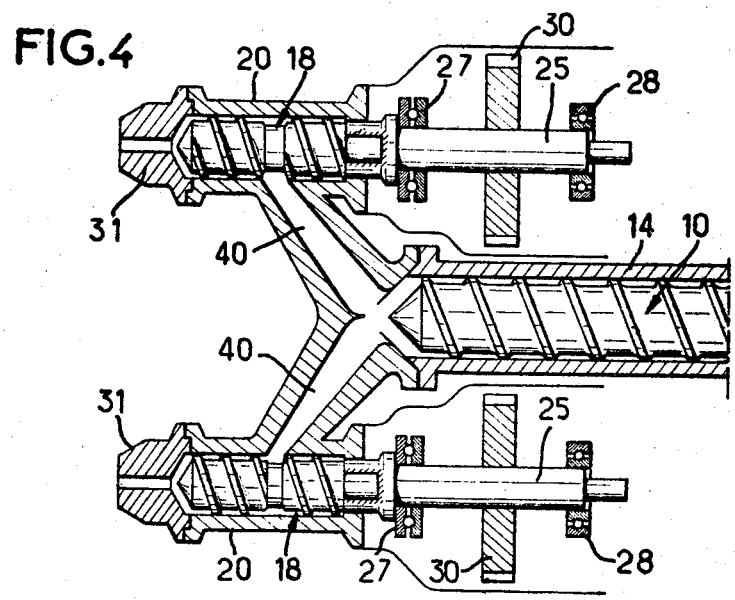

In order that the invention may be more clearly understood some embodiments thereof will now be described, by way of example, with reference to the accompanying drawings in which:

FIGURE 1 is a diagrammatic view in section of one embodiment of an extrusion press according to the invention in which the axes of an extrusion screw and a kneading screw intersect at a right angle, FIGURE 2 is a cross section taken on the line 2—2 of FIGURE 1, FIGURE 3 is a variation of the detail represented in FIGURE 2, and FIGURE 4 is a section through a second embodiment of the invention in which two kneading screws with parallel axes are associated with and branch from a single extrusion screw.

An embodiment of an extrusion press in accordance with the invention is illustrated diagrammatically in FIGURE 1, in which the extrusion and kneading screws are perpendicular to each other.

The extrusion screw 10, the thread 11 of which has the profile and pitch of a normal screw, is housed in a cylinder 14 at the entrance to which a feed hopper (not shown) is arranged. This screw is rotatably driven in the usual way and is provided if necessary with the usual accessories, also not shown.

Cylinder 14 is joined to a cylinder or sheath 16 whose axis is perpendicular to that of the cylinder, in which sheath 16 a kneading screw 18 is housed. The diameter of the screw 18 exceeds that of screw 10, and it carries a shallow thread 20. The axis of the screw 10 intersects that of screw 18 substantially in the central portion of the latter, which has a constriction 22. The cylinder 14 is joined to cylinder 16 by an orifice of small diameter 23 opening conically towards cylinder 14 as shown at 24, to which the conical profile at the end of screw 10 corresponds. The screw 18 extends to the rear as a shaft 25 to which it is linked by a suitable coupling 26, the said shaft 25, which is mounted to rotate in ball bearings 27 and 28, itself being linked to driving means, not shown, by means of a gear 30. At its front the cylinder 16 carries an extrusion head 31 only one part of which is represented in FIGURE 1, or any other suitable device capable of working with kneaded plastic material.

It may be advantageous in certain cases to provide a restrictor grid 32 on the cylinder 14 at the outlet of the extrusion screw, ensuring the restriction of the flow of the pre-jellified material in the cylinder 14 and forming either an annular space 33 (FIGURE 2) or a succession of passages 34 after the style of a comb.

The screw 10 whose speed is adjusted according to the material worked, ensures the feeding and pre-jelling of that material in cylinder 16, which has passed through the orifice 23. There, that material is entrained by the screw 18 which ensures that it is kneaded and forces it into the head 31. It will be noted that the passage 23 is arranged in a manner such that the threads 36 of screw 18 are located at the rear of the said passage, offering resistance to the forcing of the material towards the rear of the screw. As has been previously shown, it is possible to regulate one or the other of the speeds of rotation of the extrusion screw 10 and kneading screw 18 according to the properties of the material being worked and the work carried out on that material in the course of preparation, such as jellification or colouration for example.

The speed of the kneading screw 18 is in any case regulated in a manner to ensure that the capacity output from that screw is the same as the capacity output of the feed screw.

Another embodiment of an extrusion press according to the invention is represented in FIGURE 4. In this, two kneading screws 18 are associated with a single worm screw 10 and are arranged to branch off at the outlet of screw 10 and have axes parallel thereto. The outlet from cylinder 14 housing the screw 10 is connected to the cylinders or sheaths 20 housing the kneading screws by two conduits 40, acting as passage 23 in FIG. 1 and ending like this passage, in the central area of the corresponding kneading screw 18. Each of the sheaths 20 ends in an extrusion head 31 as previously disclosed. The screws 18 are rotated by means of pinions keyed to the shafts 25 which are mounted in bearings 28 and 27 and are coupled to the screws 18.

Also as previously disclosed, screw 10 ensures that the material to be worked is fed and extruded and forces it through the conduits 40 into the sheaths 20 where it is entrained by the screws 18 which ensure that it is kneaded.

In both cases, the kneading screws whose total capacity output equals that of the extrusion screw, in addition to producing the kneading effect, ensure a pumping action controlling the output from the extrusion screw. As has been pointed out already, they enable the loss of energy caused by the extrusion head and its associated tools to be overcome without expending much energy.

The use of a kneading screw moreover enables the complex part played by the conventional screw to be simplified, as it no longer has to ensure the absorption, the feeding and heating of the material to the softening point.

I claim:

1. In a press for the extrusion of plastic material, a cylinder connectable at one end to a feed hopper, an extrusion screw mounted axially in the cylinder to be rotatably driven therein, at least one sheath joined to the other end of the cylinder, a rotatable kneading screw axially mounted in said sheath, means for rotating the kneading screw, the kneading screw comprising a shallow thread for kneading the material with the ratio of the length of the kneading screw to its diameter being between one and three, the depth of said thread being such that the circumferential speed of the kneading screw is between two and five times that of the extrusion screw when the capacity output from said kneading screw equals the capacity output from the extrusion screw.

2. A combination according to claim 1, wherein the kneading screw has a shaft of relatively large diameter adjacent said shallow thread and relatively small diameter where said cylinder empties into said at least one sheath.

3. A combination according to claim 2, wherein said kneading screw has a threaded portion behind the portion of the shaft of relatively small diameter.

References Cited

UNITED STATES PATENTS

| 2,556,391 | 6/1951 | Hawk | 18—12 X |
| 2,540,146 | 2/1951 | Stober. | |
| 2,836,851 | 6/1958 | Holt | 18—12 |
| 3,076,637 | 2/1963 | Moziek et al. | |
| 3,261,056 | 7/1966 | Fritsch | 18—12 |
| 3,285,200 | 11/1966 | Slaybaugh et al. | 18—12 |

FOREIGN PATENTS 1,251,409 12/1960 France.

WILLIAM J. STEPHENSON, *Primary Examiner.*